(12) United States Patent
Zhou

(10) Patent No.: US 10,884,767 B2
(45) Date of Patent: Jan. 5, 2021

(54) SERVICE PROCESSING METHODS AND DEVICES

(71) Applicant: Advanced New Technologies Co., Ltd., George Town (KY)

(72) Inventor: Yuguo Zhou, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 16/663,977

(22) Filed: Oct. 25, 2019

(65) Prior Publication Data
US 2020/0057662 A1 Feb. 20, 2020

Related U.S. Application Data

(63) Continuation of application No. PCT/CN2018/084617, filed on Apr. 26, 2017.

(30) Foreign Application Priority Data

Apr. 28, 2017 (CN) .......................... 2017 1 0294841

(51) Int. Cl.
*G06F 9/451* (2018.01)
*G06F 16/245* (2019.01)
(Continued)

(52) U.S. Cl.
CPC ................ *G06F 9/451* (2018.02); *G06F 3/14* (2013.01); *G06F 8/38* (2013.01); *G06F 9/30181* (2013.01);
(Continued)

(58) Field of Classification Search
CPC ..................................................... G06F 9/451
(Continued)

(56) References Cited

U.S. PATENT DOCUMENTS 6,052,527 A * 4/2000 Delcourt ................... G06F 8/10
717/138
6,167,567 A * 12/2000 Chiles ..................... G06F 9/454
717/173
(Continued)

FOREIGN PATENT DOCUMENTS

CN 1610298 4/2005
CN 101064670 10/2007
(Continued)

OTHER PUBLICATIONS

Reza Nabi, "A Service Oriented Crop Profitability Simulator realizing with Web Services", available at <http://cis895.nabi.us>, published on May 2010, 147 pages. (Year: 2010).*
(Continued)

*Primary Examiner* — Reza Nabi
(74) *Attorney, Agent, or Firm* — Fish & Richardson P.C.

(57) ABSTRACT

The specification provides example service processing methods and devices. One example method includes detecting a device type of an electronic device. An instruction processing rule corresponding to the device type is obtained. The instruction processing rule includes an instruction set conversion rule defining a process for converting display modification instructions generated by the electronic device into unified display modification instructions. A first display modification instruction initiated in response to a user interacting with the electronic device is obtained based on the instruction processing rule. The first display modification instruction is converted into a corresponding first unified display modification instruction according to the instruction processing rule. A portion of interaction data output to a display us updated by invoking a service processing mode corresponding to the first unified display modification instruction.

17 Claims, 10 Drawing Sheets

(51) Int. Cl.
   *G06F 3/14*   (2006.01)
   *G06F 8/38*   (2018.01)
   *G06F 9/30*   (2018.01)
   *H04L 12/24*  (2006.01)
   *H04L 29/12*  (2006.01)

(52) U.S. Cl.
   CPC ........ *G06F 16/245* (2019.01); *H04L 41/0806* (2013.01); *H04L 61/6022* (2013.01)

(58) Field of Classification Search
   USPC ........................................................ 715/764
   See application file for complete search history.

(56) References Cited

U.S. PATENT DOCUMENTS

| | | | | |
|---|---|---|---|---|
| 6,925,595 | B1* | 8/2005 | Whitledge | G06F 16/9577 715/234 |
| 7,657,868 | B2* | 2/2010 | Shenfield | G06F 8/20 717/107 |
| 8,612,933 | B1* | 12/2013 | Gill | G06F 9/455 717/110 |
| 9,239,713 | B1* | 1/2016 | Lakshman | G06F 9/451 |
| 9,361,131 | B1* | 6/2016 | Gill | G06F 8/30 |
| 10,671,364 | B2* | 6/2020 | Machalani | G06F 3/0482 |
| 2005/0057560 | A1* | 3/2005 | Bibr | G06F 8/656 345/418 |
| 2005/0172263 | A1* | 8/2005 | Hariharan | G06F 9/451 717/109 |
| 2006/0101162 | A1* | 5/2006 | Ivarsy | G06F 9/451 710/8 |
| 2008/0092149 | A1* | 4/2008 | Rowbotham | G06F 9/451 719/321 |
| 2009/0248883 | A1* | 10/2009 | Suryanarayana | G06F 9/451 709/229 |
| 2009/0313004 | A1* | 12/2009 | Levi | G06F 8/30 703/28 |
| 2010/0122196 | A1* | 5/2010 | Wetzer | G06F 9/54 715/769 |
| 2012/0102428 | A1 | 4/2012 | Stewart | |
| 2012/0159308 | A1* | 6/2012 | Tseng | G06F 40/14 715/234 |
| 2012/0256857 | A1 | 10/2012 | Mak | |
| 2012/0290914 | A1* | 11/2012 | Lee | G06F 9/541 715/234 |
| 2013/0007698 | A1* | 1/2013 | Warila | H04W 84/12 717/106 |
| 2013/0111336 | A1* | 5/2013 | Dorman | G06F 9/4843 715/255 |
| 2013/0145346 | A1* | 6/2013 | Liu | G06F 8/51 717/113 |
| 2013/0152067 | A1* | 6/2013 | Fernandez-Ruiz | G06F 8/60 717/172 |
| 2013/0152072 | A1* | 6/2013 | Fernandez-Ruiz | H04L 67/42 717/175 |
| 2013/0166692 | A1* | 6/2013 | Tjin | G06F 16/4387 709/219 |
| 2013/0263112 | A1* | 10/2013 | Fernandez-Ruiz | G06F 9/50 717/178 |
| 2014/0002483 | A1* | 1/2014 | Hong | G06T 11/206 345/619 |
| 2014/0052821 | A1* | 2/2014 | Prasad | G06F 16/9577 709/218 |
| 2014/0099920 | A1* | 4/2014 | Belanger | H04W 4/021 455/411 |
| 2014/0149966 | A1* | 5/2014 | Binjrajka | G06F 8/72 717/121 |
| 2014/0317596 | A1* | 10/2014 | Bouris | G06F 9/44536 717/106 |
| 2014/0325470 | A1* | 10/2014 | Padmavilasom | H04L 67/289 717/100 |
| 2015/0074541 | A1* | 3/2015 | Schwartz | G06F 9/44 715/740 |
| 2016/0070457 | A1* | 3/2016 | Furtwangler | G06F 8/35 715/763 |
| 2016/0188302 | A1* | 6/2016 | Fredrick | G06F 8/34 717/107 |
| 2016/0188730 | A1* | 6/2016 | Delli Santi | G06F 16/951 707/728 |
| 2016/0308953 | A1* | 10/2016 | Anschutz | H04L 67/10 |
| 2017/0192827 | A1* | 7/2017 | Ghafourifar | G06F 9/543 |
| 2017/0212771 | A1* | 7/2017 | Weissberg | G06F 3/04845 |
| 2018/0095941 | A1* | 4/2018 | Ciabarra, Jr. | G06F 40/123 |
| 2018/0176097 | A1* | 6/2018 | Russell | G06F 9/451 |
| 2018/0225034 | A1* | 8/2018 | Man | G06F 3/0481 |
| 2018/0349108 | A1* | 12/2018 | Brebner | G06F 8/34 |
| 2019/0050209 | A1* | 2/2019 | Pandey | G06F 8/71 |
| 2019/0238614 | A1* | 8/2019 | Ballinger | H04L 69/24 |
| 2020/0050502 | A1* | 2/2020 | Ghafourifar | G06F 9/5027 |
| 2020/0057662 | A1* | 2/2020 | Zhou | G06F 9/44542 |
| 2020/0184535 | A1* | 6/2020 | Barkan | G06F 9/541 |
| 2020/0233681 | A1* | 7/2020 | Garstenauer | G06F 9/451 |

FOREIGN PATENT DOCUMENTS

| | | |
|---|---|---|
| CN | 101257491 | 9/2008 |
| CN | 101968793 | 2/2011 |
| CN | 103226432 | 7/2013 |
| CN | 105903191 | 8/2016 |
| CN | 106293743 | 1/2017 |
| CN | 106462406 | 2/2017 |
| CN | 106569613 | 4/2017 |
| CN | 107357560 | 11/2017 |
| JP | 2001034679 | 2/2001 |
| JP | 2010009623 | 1/2010 |
| JP | 2013127713 | 6/2013 |
| JP | 2013529811 | 7/2013 |
| RU | 2348969 | 3/2009 |
| TW | 201346592 | 11/2013 |
| WO | WO 2001086428 | 11/2001 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Preliminary Report on Patentability in International Application No. PCT/CN2018/084617, dated Oct. 29, 2019, 9 pages (with English translation).

PCT International Search Report and Written Opinion in International Application No. PCT/CN2018/084617, dated Aug. 6, 2018, 13 pages (with English translation).

European Extended Search Report in European Patent Application No. 18791926.1, dated Jan. 28, 2020, 9 pages.

* cited by examiner

SERVICE PROCESSING METHODS AND DEVICES

CROSS-REFERENCE TO RELATED APPLICATIONS

This application is a continuation of PCT Application No. PCT/CN2018/084617, filed on Apr. 26, 2018, which claims priority to Chinese Patent Application No. 201710294841.1, filed on Apr. 28, 2017, and each application is hereby incorporated by reference in its entirety.

TECHNICAL FIELD

The specification relates to the field of Internet technologies, and in particular, to service processing methods and devices.

BACKGROUND

With rapid development of Internet technologies and electronic device technologies, there are more and more types of electronic devices such as VR devices, personal computers, tablet computers, or smartphones. Different types of electronic devices can run different operating systems, and use different programming languages to write interaction instructions. Therefore, a service provider that provides certain services usually needs to develop different application programs for the different types of electronic devices.

For example, by using a service provider that provides a K-line share graph as an example, a smartphone, a personal computer, and a VR device can all access a website provided by the service provider or install an application program provided by the service provider, to view the K-line share graph provided by the service provider. In a process of viewing the K-line share graph, the device can further initiate an interaction instruction such as shifting to the left, shifting to the right, pinching and stretching, or sliding up, and the service provider performs corresponding processing on the K-line share graph based on the interaction instruction, and provides processed data for the device for rendering display. For interaction instructions initiated by the smartphone, the personal computer, and the virtual reality (VR) device, the service provider needs to develop different service processing modules for different devices, to detect and identify interaction instructions of the different devices. It can be learned that in the service processing mode in the related technology, the service provider needs to invest a relatively large quantity of development resources and costs.

SUMMARY

To make an improvement in a related technology, the specification provides service processing methods and devices.

According to a first aspect of embodiments of the specification, a service processing method is provided, where an instruction processing rule corresponding to each device type is configured according to the method; and the method includes the following: detecting a device type of an electronic device that needs to display interaction data; obtaining an instruction processing rule corresponding to the detected device type; obtaining, based on the instruction processing rule, a device interaction instruction initiated by the electronic device, and converting the device interaction instruction into a corresponding unified interaction instruction; and processing the interaction data by invoking a service processing mode corresponding to the unified interaction instruction obtained through conversion, and providing processed interaction data for the electronic device for display.

In an optional embodiment, the detecting a device type of an electronic device that needs to display interaction data includes the following: initiating a device type query request to the electronic device; and receiving device type description information fed back by the electronic device based on the query request, and determining the device type based on the device type description information.

In an optional embodiment, the instruction processing rule includes an instruction acquisition rule used to obtain the device interaction instruction initiated by the electronic device, and an instruction set conversion rule used to convert the device interaction instruction into the corresponding unified interaction instruction.

In an optional embodiment, the instruction processing rule is preconfigured in the following way: receiving a correspondence among a device type, a device interaction instruction, and a unified interaction instruction that are sent by a development side device, and configuring the instruction processing rule based on the correspondence.

In an optional embodiment, a coding scheme for the unified interaction instruction is a coding scheme of one of different device types for a device interaction instruction.

According to a second aspect of embodiments of the specification, a service processing device is provided, where an instruction processing rule corresponding to each device type is configured according to the device; and the device includes the following: a type detection module, configured to detect a device type of an electronic device that needs to display interaction data; a rule acquisition module, configured to obtain an instruction processing rule corresponding to the detected device type; an instruction conversion module, configured to obtain, based on the instruction processing rule, a device interaction instruction initiated by the electronic device, and convert the device interaction instruction into a corresponding unified interaction instruction; and a service processing module, configured to process the interaction data by invoking a service processing mode corresponding to the unified interaction instruction obtained through conversion, and provide processed interaction data for the electronic device for display.

In an optional embodiment, the type detection module is further configured to: initiate a device type query request to the electronic device; and receive device type description information fed back by the electronic device based on the query request, and determine the device type based on the device type description information.

In an optional embodiment, the instruction processing rule includes an instruction acquisition rule used to obtain the device interaction instruction initiated by the electronic device, and an instruction set conversion rule used to convert the device interaction instruction into the corresponding unified interaction instruction.

In an optional embodiment, the instruction processing rule is preconfigured in the following way: receiving a correspondence among a device type, a device interaction instruction, and a unified interaction instruction that are sent by a development side device, and configuring the instruction processing rule based on the correspondence.

In an optional embodiment, a coding scheme for the unified interaction instruction is a coding scheme of one of different device types for a device interaction instruction.

According to a third aspect of embodiments of the specification, a service processing device is provided, and includes a processor and a memory configured to store a processor executable instruction, where the processor is configured to: detect a device type of an electronic device that needs to display interaction data; obtain an instruction processing rule corresponding to the detected device type; obtain, based on the instruction processing rule, a device interaction instruction initiated by the electronic device, and convert the device interaction instruction into a corresponding unified interaction instruction; and process the interaction data by invoking a service processing mode corresponding to the unified interaction instruction obtained through conversion, and provide processed interaction data for the electronic device for display.

The technical solutions provided in the embodiments of the specification can include the following beneficial effects:

In the embodiments of the specification, the instruction processing rule corresponding to each device type is configured. Therefore, device interaction instructions of different types of electronic devices can be converted into the unified interaction instruction. Because the service processing mode corresponding to the unified interaction instruction is preconfigured, the interaction data can be processed, and the processed interaction data can be provided for the electronic device for display. In the embodiments of the specification, a same interaction effect can be achieved based on different end-user devices and support capabilities, and developers do need to develop different interaction modules for different devices. Therefore, development resources and costs can be significantly reduced, and development efficiency can be improved.

It should be understood that the previously described general descriptions and the following detailed descriptions are merely examples for explanation, and do not limit the specification.

BRIEF DESCRIPTION OF DRAWINGS

The accompanying drawings here are incorporated in the specification and become a part of the specification, show embodiments that are in accordance with the specification, and are used together with the specification to explain a principle of the specification.

DESCRIPTION OF EMBODIMENTS

Figure 1A:
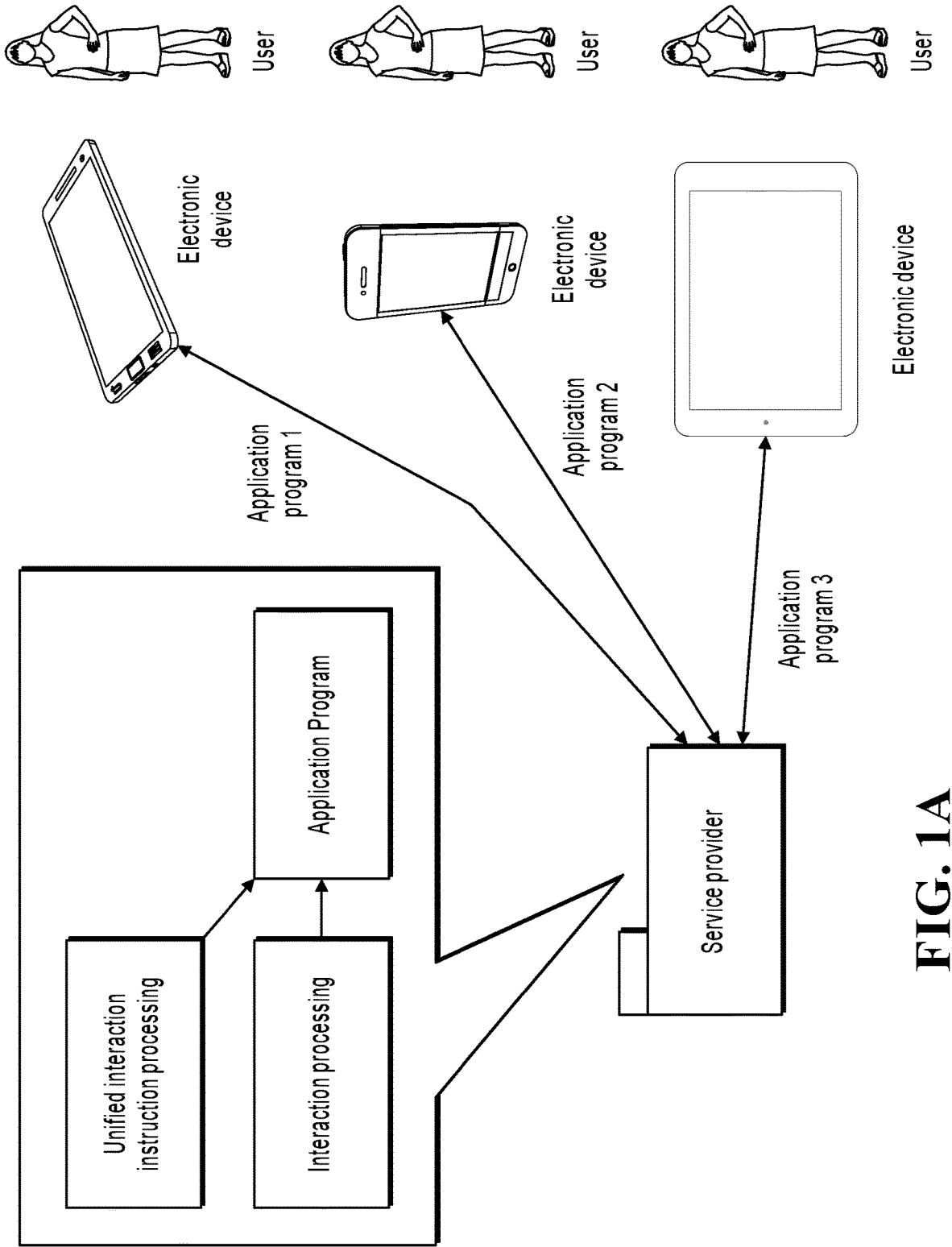
FIG. 1A is a schematic diagram illustrating an example of a service processing scenario, according to embodiments of the specification.

Embodiments are described in detail here, and examples of the embodiments are presented in the accompanying drawings. When the following description relates to the accompanying drawings, unless specified otherwise, same numbers in different accompanying drawings represent a same or similar element. Embodiments described in the following examples do not represent all embodiments consistent with the specification. On the contrary, the embodiments are merely examples of devices and methods that are described in detail in the appended claims and that are consistent with some aspects of the specification.

The terms used in the specification are merely for the purpose of illustrating specific embodiments, and are not intended to limit the specification. The terms "a", "said" and "the" in singular forms used in the specification and the appended claims are also intended to include plural forms, unless otherwise specified in the context clearly. It should be further understood that the term "and/or" used in the specification indicates and includes any or all possible combinations of one or more associated listed items.

It should be understood that although the terms such as "first", "second", "third", etc. can be used in the specification to describe various information, the information is not limited by the terms. These terms are merely used to distinguish between information of a same type. For example, without departing from the scope of the specification, first information can also be referred to as second information, and similarly the second information can also be referred to as the first information, which depends on the context. For example, the term "if" used here can be explained as "while", "when", or "in response to determining".

With rapid development of Internet technologies and electronic device technologies, there are more and more types of electronic devices such as VR devices, personal computers, tablet computers, or smartphones. Different types of electronic devices can run different operating systems, and use different programming languages to write interaction instructions. Therefore, a service provider that provides some services usually needs to develop different application programs for the different types of electronic devices.

In a related technology, many services relate to service processing. In an example, a service provider in a financial graph can provide a user with a service of viewing a K-line share graph. When an electronic device displays the K-line share graph, the user can need to perform an interaction operation such as sliding up, sliding down, or pinching and stretching on the displayed graph. The electronic device can obtain graph data obtained after the service processing based on the interaction operation performed by the user, and display a new graph. In another example, a service provider that provides a map service can provide a service of viewing a map. When an electronic device displays a map, a user can need to perform an interaction operation such as sliding up, sliding down, or pinching and stretching on the displayed map. The electronic device can obtain map data obtained after the service processing based on the interaction operation performed by the user, and display a new map.

A service provider usually needs to develop different application programs for different types of electronic devices, and therefore the service provider needs to invest a relatively large quantity of development resources and costs. The embodiments of the specification provide a service processing solution, so as to reduce development costs and development resources of the service provider, and improve development efficiency of an interaction system. The following describes the embodiments of the specification in detail.

FIG. 1A is a schematic diagram illustrating an example of a service processing scenario, according to embodiments of the specification. A service provider and four electronic devices of different types are included in FIG. 1A, and a user can install an application program provided by the service provider on the electronic devices.

Figure 1B:
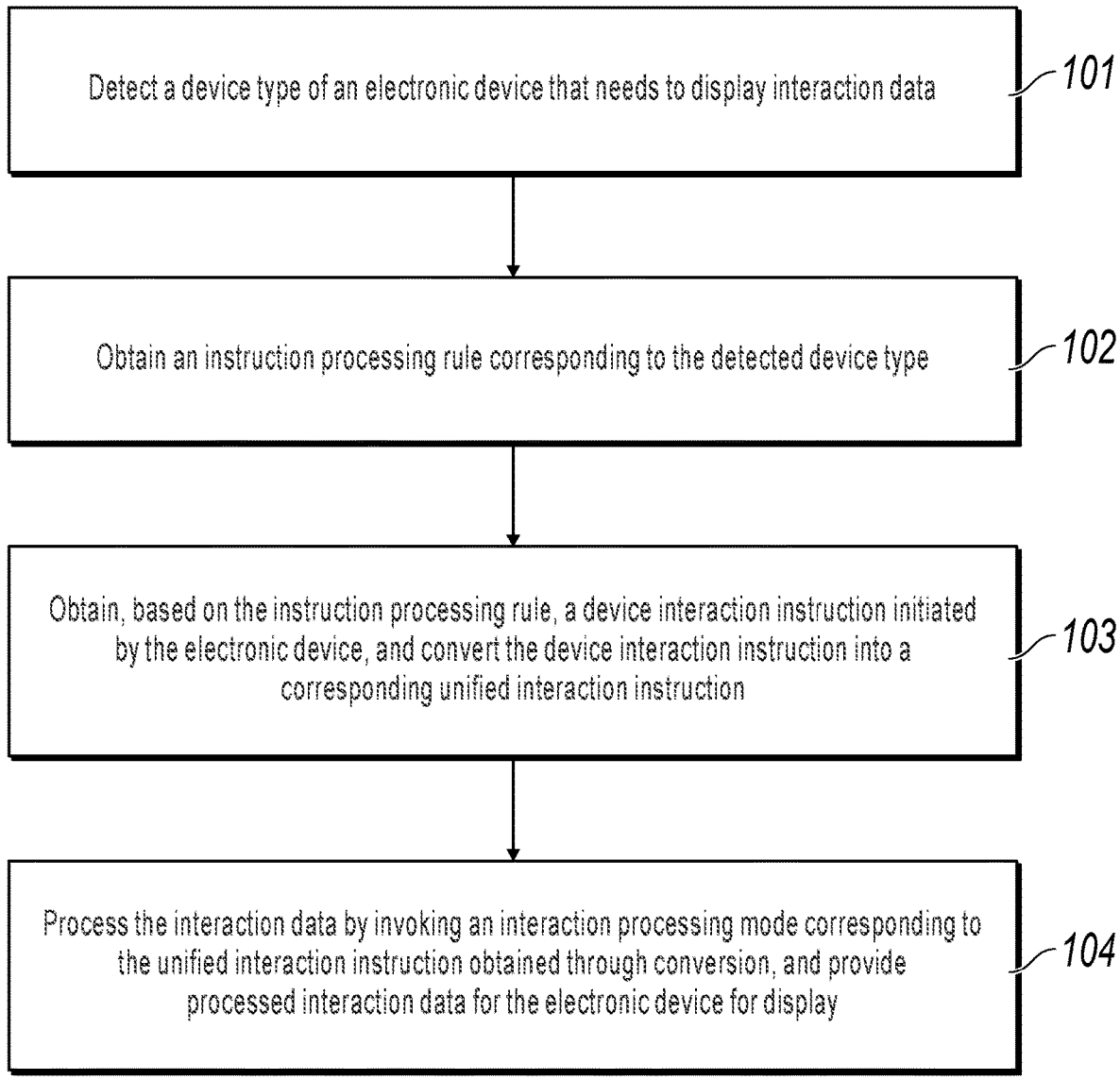
FIG. 1B is a flowchart illustrating an example of a service processing method, according to embodiments of the specification.

FIG. 1B is a flowchart illustrating an example of a service processing method, according to embodiments of the specification. An instruction processing rule corresponding to each device type is configured according to the method, and the method can include the following steps 101 to 104:

Step 101: Detect a device type of an electronic device that needs to display interaction data.

Step 102: Obtain an instruction processing rule corresponding to the detected device type.

Step 103: Obtain, based on the instruction processing rule, a device interaction instruction initiated by the electronic device, and convert the device interaction instruction into a corresponding unified interaction instruction.

Step 104: Process the interaction data by invoking a service processing mode corresponding to the unified interaction instruction obtained through conversion, and provide processed interaction data for the electronic device for display.

Figure 1C:
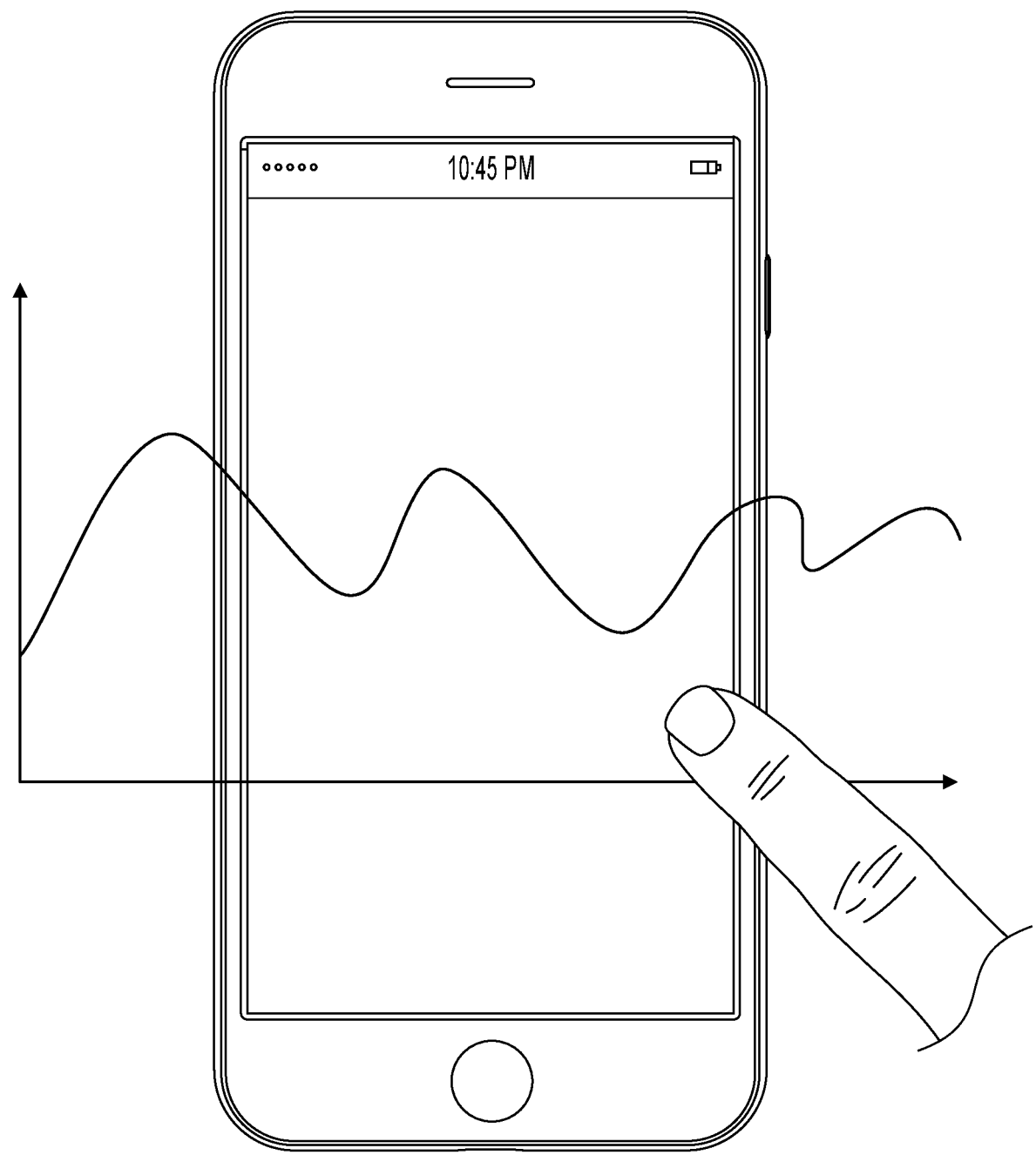
FIG. 1C is a schematic diagram illustrating an example of an interaction page displayed by an electronic device, according to embodiments of the specification.

In some embodiments, although the service processing process is for different devices, interaction operation objectives that a user needs to achieve for the different devices are consistent. For example, FIG. 1C is a schematic diagram illustrating an example of an interaction page displayed by an electronic device. Because there is a relatively large amount of data on the interaction page, the electronic device displays only a part of the data, and data on the right of the diagram is not displayed on a device screen. Assume that the user needs to view the data on the right of the diagram, if the electronic device is a device that supports a touch function, the user can slide to the left on a touchscreen, and the electronic device detects an event of sliding to the left, and determines that the data on the right of the diagram needs to be displayed. If the electronic device is a personal computer, the user can drag to the left on a page by using a mouse, perform an operation on a sliding control displayed on the page by using the mouse, shift to the left by using a direction key on a keyboard, etc. The personal computer detects one of the previously described events, and determines that the data on the right of the diagram needs to be displayed. If the electronic device is a VR device, the user can turn the head to the right. The VR device detects the event, and determines that the data on the right of the diagram needs to be displayed.

Based on the previously described analysis, it can be determined that although different electronic devices are used for a same piece of interaction data, interaction operation objectives that the user needs to achieve are consistent. Therefore, in some embodiments, a unified interaction instruction is preconfigured for a same interaction data processing objective, an instruction processing rule for different device types is predetermined for the unified interaction instruction, and a corresponding service processing mode is configured.

Figure 1D:
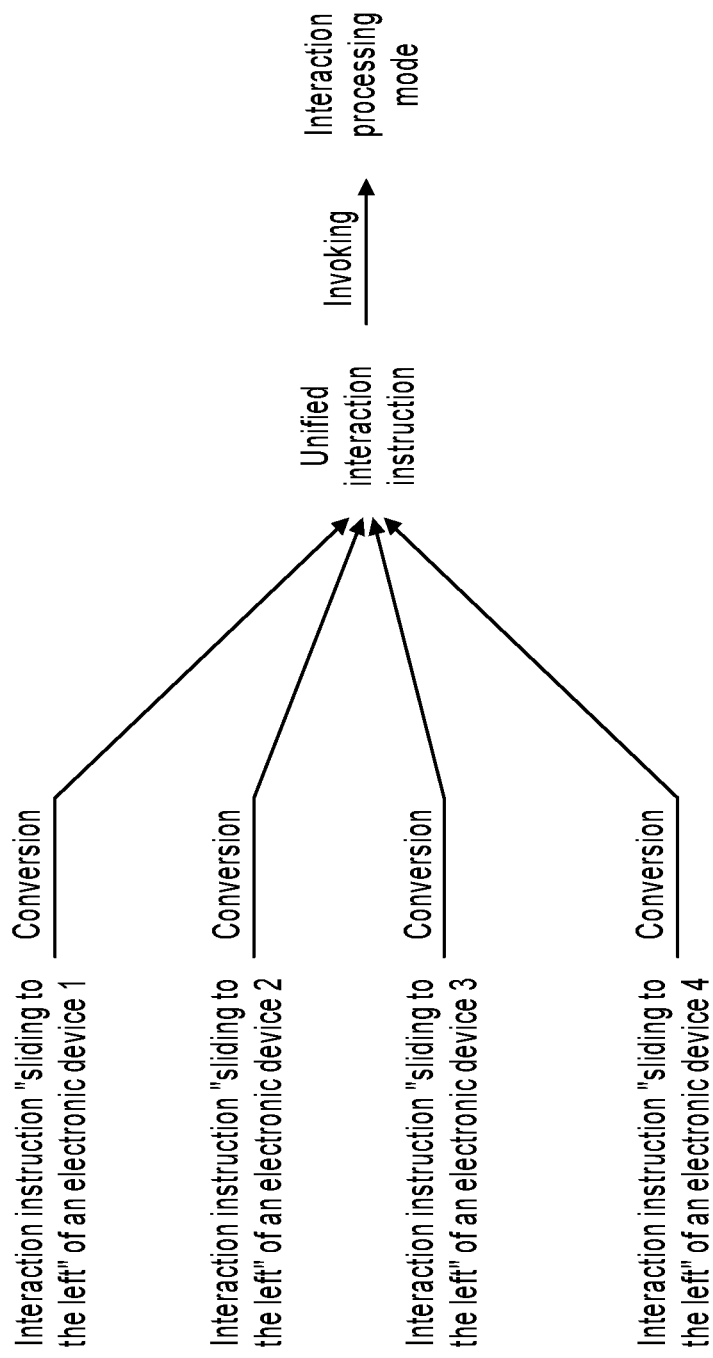
FIG. 1D is a schematic diagram illustrating an example of processing of a device interaction instruction and a unified interaction instruction, according to embodiments of the specification.

For example, FIG. 1D is a schematic diagram illustrating an example of processing of a device interaction instruction and a unified interaction instruction. FIG. 1D shows interaction instructions of sliding to the left that are initiated by four electronic devices. According to an instruction processing rule corresponding to each type, a corresponding instruction processing rule can be followed by a same unified interaction instruction, and a corresponding service processing mode is preconfigured for the unified interaction instruction. Therefore, the service processing mode can be invoked to process interaction data.

A device type is used to distinguish between devices that support different interaction trigger modes, and the device type can include an electronic device that supports a gravity sensing function, a VR device, a personal computer, an electronic device that supports a gesture recognition function, etc. In practice, the device type can be flexibly configured as needed. This is not limited in embodiments of the specification. An objective of distinguishing between device types is that because different types of electronic devices can run different operating systems and use different programming languages to code interaction instructions, corresponding instruction processing rules are preconfigured for the different device types, to invoke the corresponding instruction processing rules to process the interaction instructions initiated by the electronic devices.

After an application program is installed on the electronic device and started, a device type can be first detected. For example, it can be successively detected whether the device is a VR device, a device that supports a gravity sensing function, a device that supports a gesture recognition function, a device that accesses a mouse, etc. In some examples, some application programs can have permission to directly read related device information of the electronic device, for example, a MAC address, a device name, or a device model, so as to determine a device type of the electronic device. In some other examples, an operating system of the electronic device has a device information read interface. Therefore, the detecting a device type of an electronic device that needs to display interaction data further includes the following: initiating a device type query request to the electronic device; and receiving device type description information fed back by the electronic device based on the query request, and determining the device type based on the device type description information.

In some embodiments, the device type query request can be initiated to the electronic device by using an interface that the electronic device has. The electronic device sends the device type description information to an application program as requested by the application program. The application program receives the device type description information, and determines the device type based on the device type description information. The device type description information can be device type information, a MAC address, a device name, a device model, etc.

After the device type of the electronic device is determined, the instruction processing rule corresponding to the device type can be invoked, to obtain the device interaction instruction initiated by the electronic device, and convert the device interaction instruction into the unified interaction instruction. For how to obtain the device interaction instruction of the electronic device, in some examples, the operating system of the electronic device can capture an interaction operation initiated by the user. The operating system has a related interface of the interaction instruction, and the application program of the electronic device can obtain the device interaction instruction by using the interface. How to obtain the device interaction instruction by using the interface can be flexibly configured based on different operating system needs.

The unified interaction instruction is predetermined to one or more instructions and a combination of the instructions based on an actual interaction need. For example, the unified interaction instruction can include one or a combination of tapping, touching and holding, sliding to the left, sliding to the right, sliding up, sliding down, pinching and stretching, and rotating. A coding scheme for the unified interaction instruction can be flexibly configured in practice, for example, the unified interaction instruction can be identified by using a digit, a character, or a character string. For example, a unified interaction instruction that represents "tapping" is represented as abc, a unified interaction instruction that represents "touching and holding" is represented as xyz, etc. This is not limited in embodiments of the specification.

To reduce development costs and improve development efficiency, in an optional embodiment, a coding scheme for the unified interaction instruction is a coding scheme of one of different device types for a device interaction instruction. In this embodiment, because corresponding coding schemes of all device types have been configured for device interaction instructions, one of the coding schemes can be selected as the coding scheme for the unified interaction instruction. For example, assume that there are four device types, coding schemes of the four device types for device interaction instructions can be obtained, and one of the coding schemes can be selected as the coding scheme for the unified interaction instruction, in other words, a device interaction instruction of one of the device types is used as the unified interaction instruction. Therefore, development costs can be reduced, and no instruction conversion needs to be performed on the device interaction instruction of the selected device type, so as to significantly improve service processing efficiency.

It can be learned from the previously described analysis that device interaction instructions of different operating systems can be obtained in different ways, and the instruction processing rule can be used to obtain the device interaction instruction, and convert the device interaction instruction into the unified interaction instruction. In some examples, device types can be different, but the electronic devices all run in a same operating system. For a same operating system, an interface for obtaining a device interaction instruction can be the same. However, because the device types are different, different trigger modes can be supported. For example, both a device that supports a gravity sensor and a device that supports a gesture event can run in an Android operating system although they are two different types of devices. In this case, the instruction processing rule includes an instruction acquisition rule used to obtain the device interaction instruction initiated by the electronic device, and an instruction set conversion rule used to convert the device interaction instruction into the corresponding unified interaction instruction.

In some embodiments, developers can flexibly configure the instruction set conversion rule as needed. In an optional embodiment, the instruction set conversion rule is preconfigured in the following way: receiving a correspondence among a device type, a device interaction instruction, and a unified interaction instruction that are sent by a development side device, and configuring the instruction processing rule based on the correspondence.

In some embodiments, the developers can be further provided with an instruction extension function, and the developers can extend the unified interaction instruction as needed. Specifically, the developers can configure the correspondence among a device type, a device interaction instruction, and a unified interaction instruction as needed, so as to preconfigure the instruction processing rule based on the correspondence.

Because configuring the unified interaction instruction, the developers do not need to consider adaptation between different devices when performing service processing development. Therefore, development costs can be significantly reduced, and workload can be improved. In practice, a unified interaction instruction SDK can be developed for steps 101 to 103 shown in FIG. 1B, and the SDK (which can be understood as an independent module) can be provided for the developers that perform service processing (corresponding to step 104). In addition, when an interaction component such as a webview component that can be embedded in a plurality of different devices is used, development efficiency can be more significantly improved. For example, processing of the unified interaction instruction can be used as an independent SDK, and the SDK can be based on a webview (browser kernel) technology. Therefore, according to the previously described processing, the developers can develop only a unified module based on the unified interaction instruction in the service processing process, and the unified module can be applied to service processing processes of different electronic devices. A webview component is embedded in all corresponding systems of a personal computer, an intelligent end-user device (such as Android or iOS), and a VR device. Therefore, development performed based on webview (including a native application that a webview kernel is embedded in or a web application that is directly based on a browser) is almost applied to all end-user devices. Therefore, by introducing the SDK provided in embodiments of the specification based on webveiw by using a web development technology (javascript, html, css, etc.), the developers can perform deployment on various end-user devices and achieve a unified service processing effect by developing only one set of application programs. By using the solution in some embodiments, multi-terminal deployment through one set of code can be implemented, automatic adaptation supports a plurality of device interaction modes to achieve a same interaction effect, development costs can be reduced, and reusability is relatively high.

The following describes the service processing solution in the embodiments of the specification in detail. In some embodiments, a service provider can be a graph service provider, and can provide visual and interactive graph data for a user. An operation performed by the user on the graph data usually includes: sliding to the left and right, sliding up and down, pinching and stretching, etc. In some embodiments, unified graph interaction can be implemented for different interaction operations of an end-user device such as a personal computer, a smartphone, a tablet computer, or a VR device based on a web technology (such as webview or webVR API), so as to achieve an operation effect that the user needs to achieve.

Figure 2A:
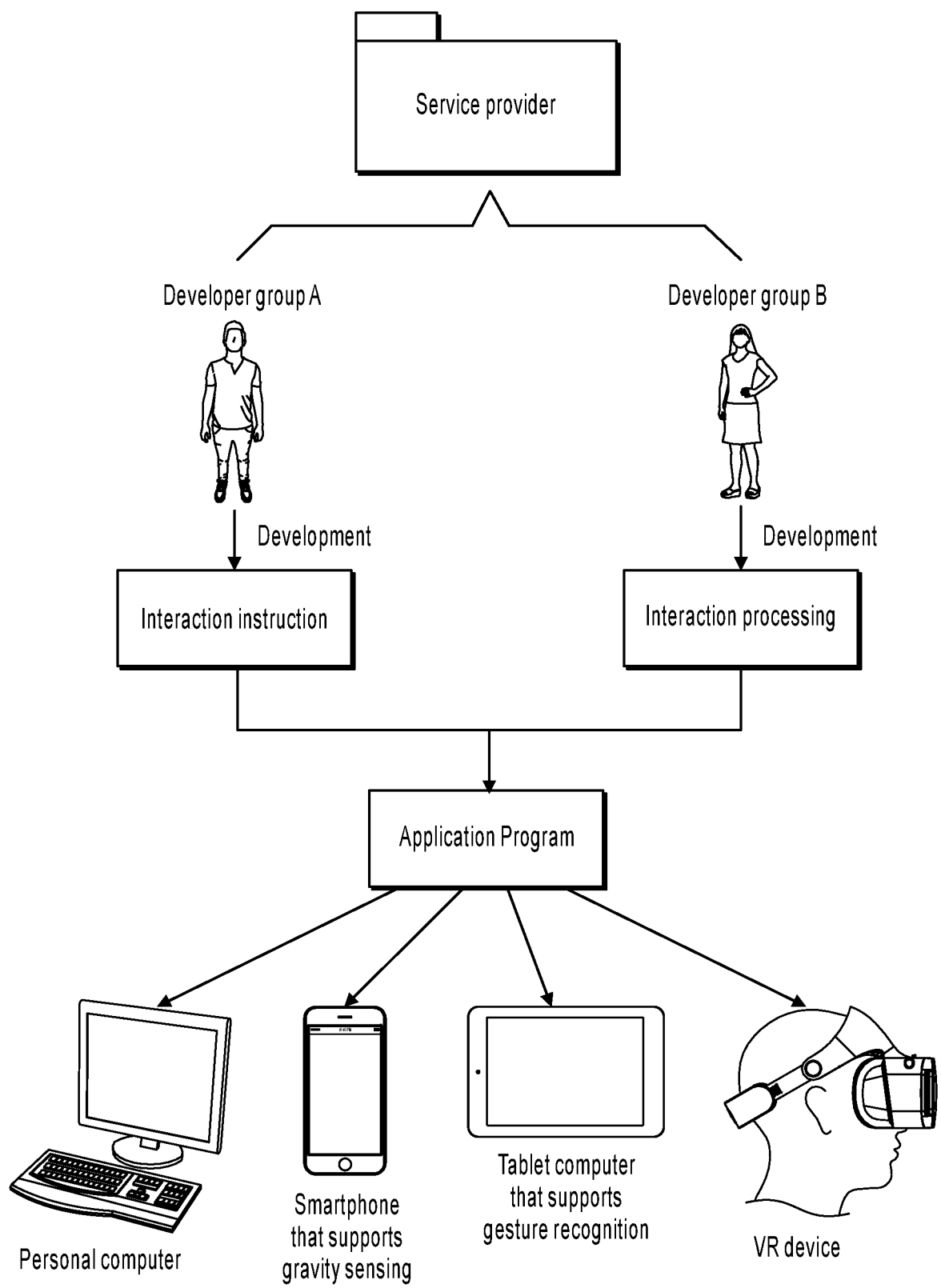
FIG. 2A is a diagram illustrating an example of an application scenario of a service processing method, according to embodiments of the specification.

FIG. 2A is a diagram illustrating an example of an application scenario of a service processing method, according to some embodiments of the specification. Two groups of developers serving as service providers are included in FIG. 2A, a developer group A is responsible for interaction instruction development, and a developer group B is responsible for service processing development.

The developer group A can pre-determine the device type, and configure an instruction acquisition rule used to obtain the device interaction instruction initiated by the electronic device, and configure an instruction set conversion rule used to convert the device interaction instruction into the corresponding unified interaction instruction, for different device types.

The unified interaction instruction includes one or a combination of basic tapping, touching and holding, sliding to the left, sliding to the right, sliding up, sliding down, pinching and stretching, and rotating. If the developer group B has more needs, the developer group B can submit an instruction need to the developer group A, which can be a correspondence between a device type, a device interaction instruction, and a unified interaction instruction. The developer group A further configures the instruction processing rule as needed by the developer group B.

The developer group A provides a unified interaction instruction SDK for the developer group B, and application developers can directly perform development by using the SDK, or can extend a customized instruction set by using an extension module of the SDK. The SDK can be accessed by directly introducing an online resource (which is sent by using a javascript file) to webview, or can be directly packaged to an application as an offline resource for release in an application packaging and release phase. Therefore, an application range supported by the SDK covers a native application that is based on a specific operating system, and can also support a browser-based online web application, etc. An application range of the SDK can be relatively wide.

Figure 2B:
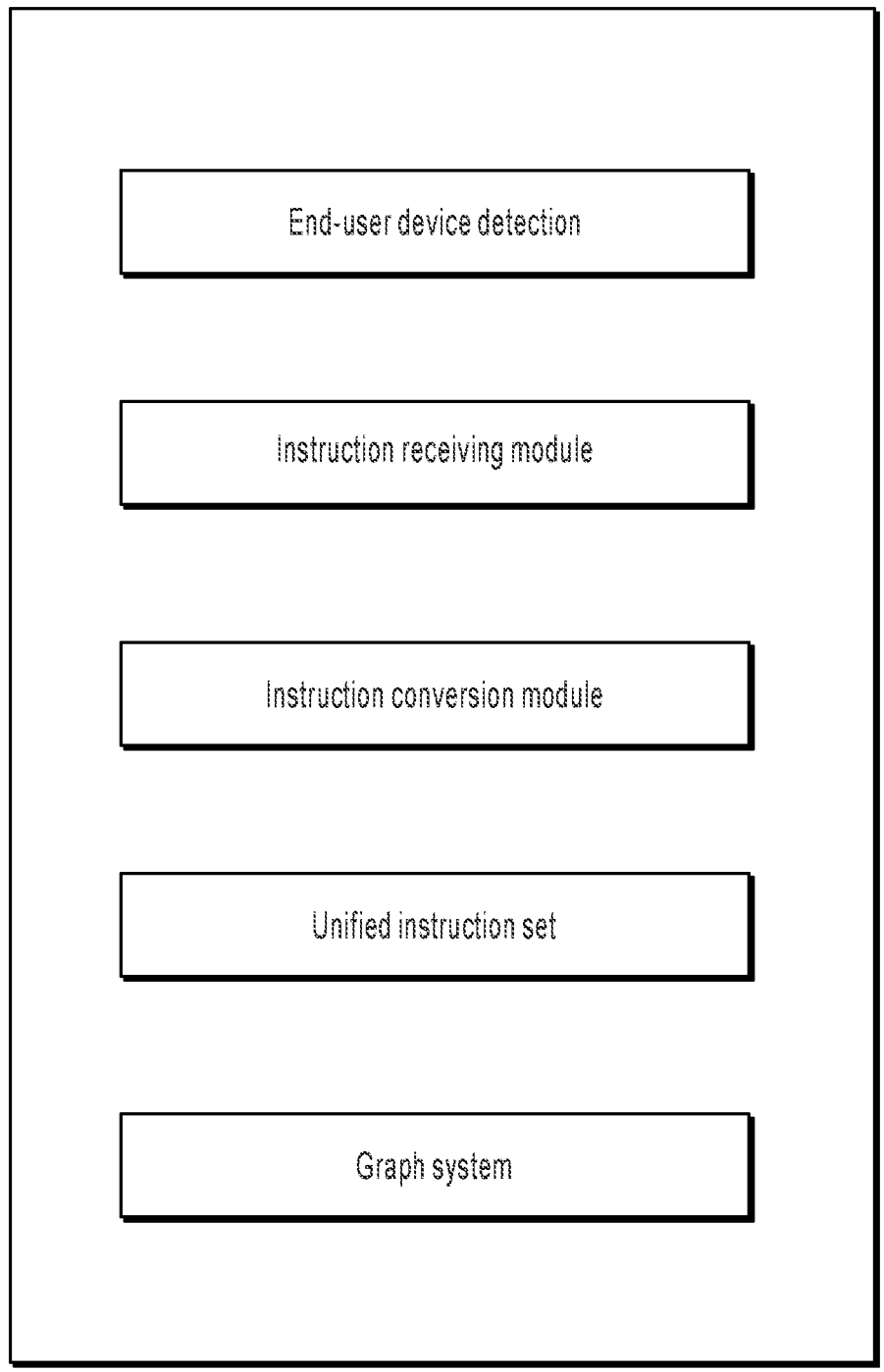
FIG. 2B is a schematic architectural diagram according to embodiments of the specification.
Figure 2C:
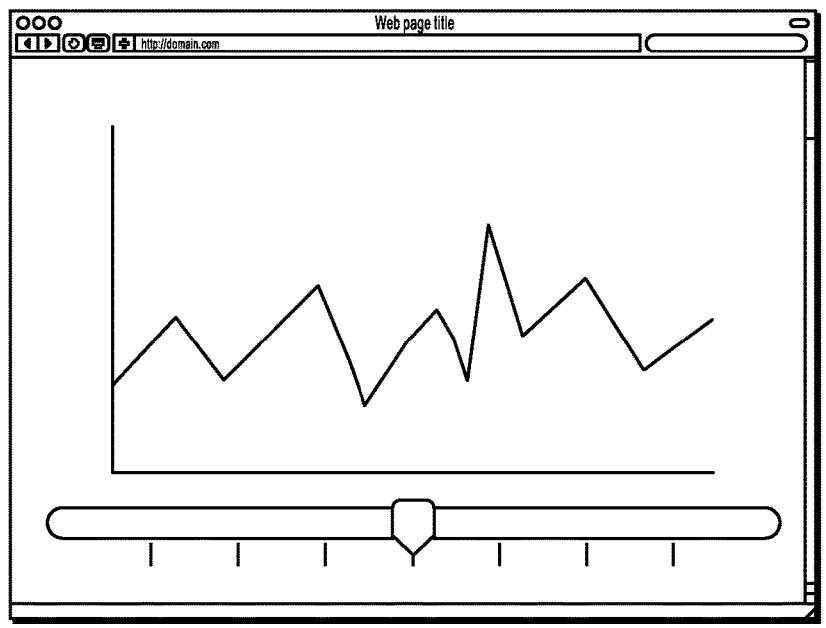
FIG. 2C is a schematic diagram illustrating an example of service processing of three electronic devices, according to embodiments of the specification.
Figure 2C:
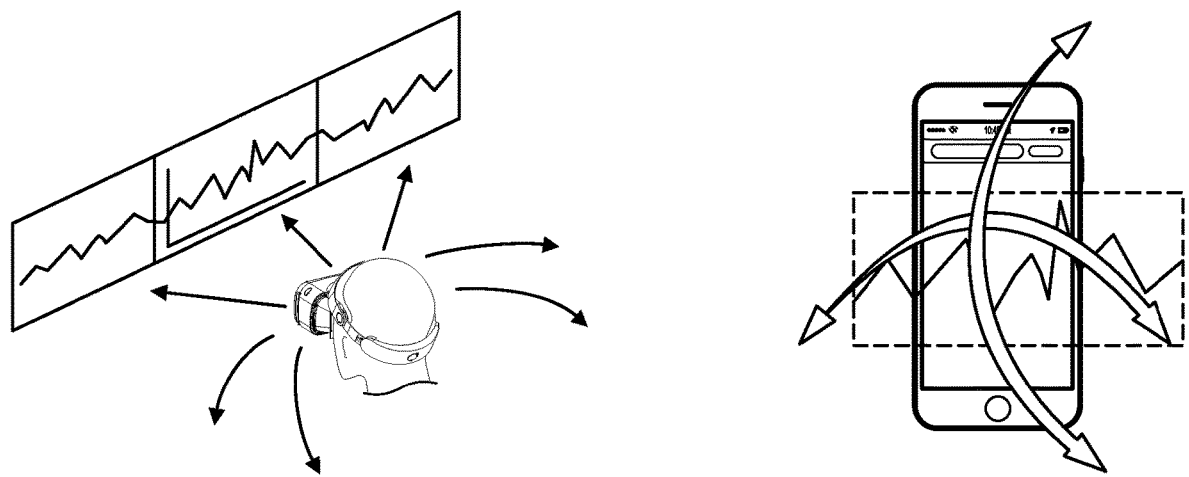

The developer group B does not need to consider adaptation between different devices, but only needs to configure the service processing mode needed by the unified interaction instruction. Development achievements of the developer group A and the developer group B are separately used as submodules of the application program. In practice, the service provider can develop more submodules having other functions as needed. Finally, the application program of the service provider can be provided for different users and installed on different electronic devices. The application program includes modules developed by the developer group A and the developer group B. FIG. 2B is a schematic architectural diagram illustrating an example of an application program, according to embodiments of the specification. FIG. 2C is a schematic diagram illustrating an example of service processing of three electronic devices, according to embodiments of the specification. A personal computer, a VR device, and a smartphone are included in FIG. 2C. Different electronic devices can perform the method in the embodiments shown in FIG. 1 or FIG. 2D. Therefore, multi-terminal deployment through one set of code can be implemented, automatic adaptation supports a plurality of device interaction modes to achieve a same interaction effect, development costs can be reduced, and reusability is relatively high.

Figure 2D:
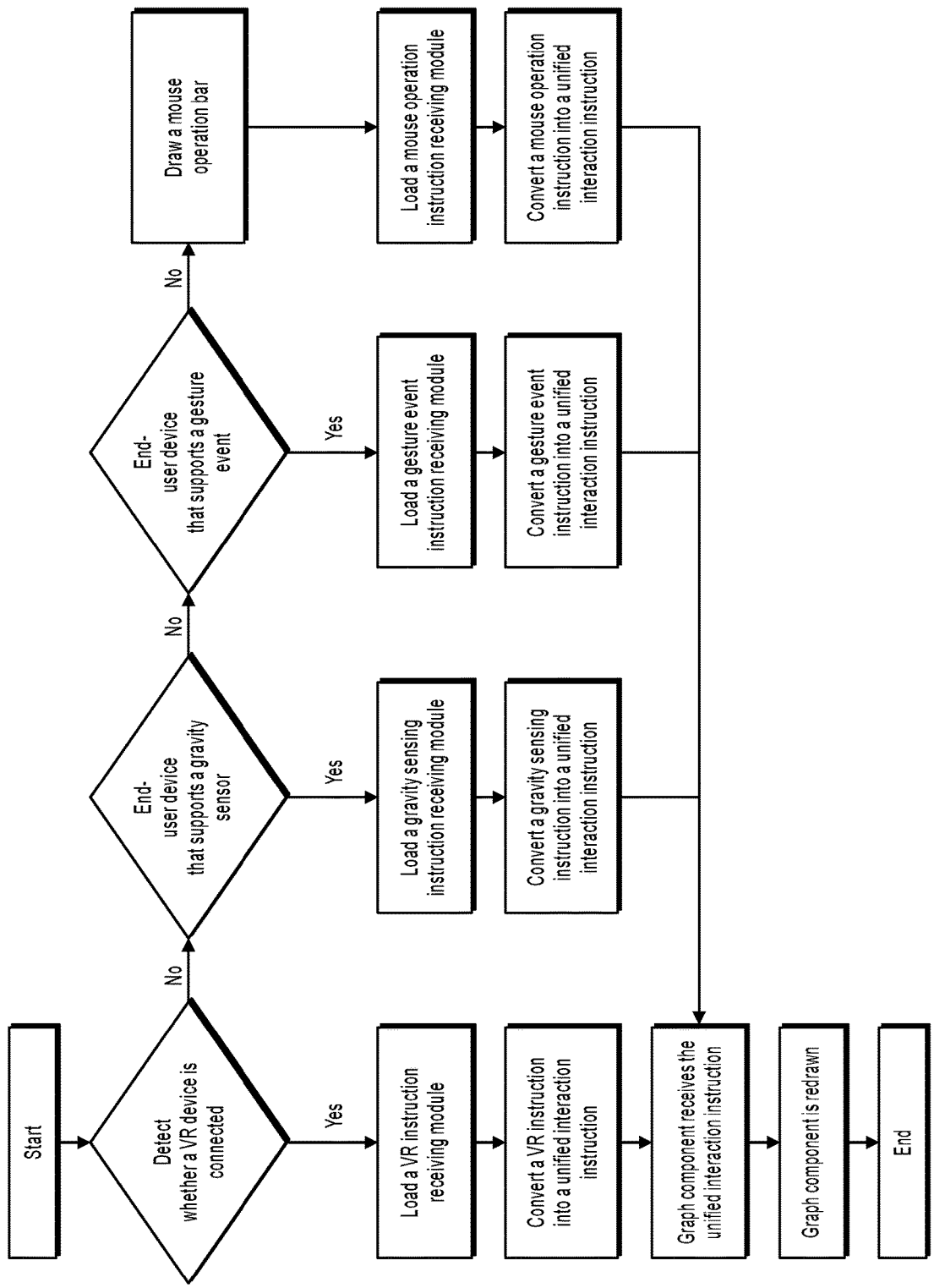
FIG. 2D is a flowchart illustrating an example of a service processing method, according to embodiments of the specification.

Specifically, with reference to FIG. 2B and FIG. 2D, after the electronic device is started, a service processing process is as follows:

End-user device detection: It is detected whether the electronic device is a VR device, an end-user device that supports a gravity sensor, an end-user device that supports a gesture event, or a mouse device.

Instruction receiving module: A VR instruction receiving module, a gravity sensing instruction receiving module, a gesture event instruction receiving module, or a mouse operation instruction receiving module is prepared in advance based on different device types, and a corresponding instruction receiving module is loaded based on a type of an end-user device.

Unified instruction set: A unified interaction instruction set is prepared in advance based on the different device types.

Instruction conversion module: A received instruction is converted into a unified interaction instruction based on the previously described loaded instruction receiving module.

Graph system: The unified interaction instruction is received, and an icon component is drawn based on the unified interaction instruction, to output the icon component to the electronic device for user check.

Corresponding to the previously described embodiments of the service processing method, the specification further provides embodiments of a service processing device and an electronic device that the service processing device is applied to.

Figure 3:
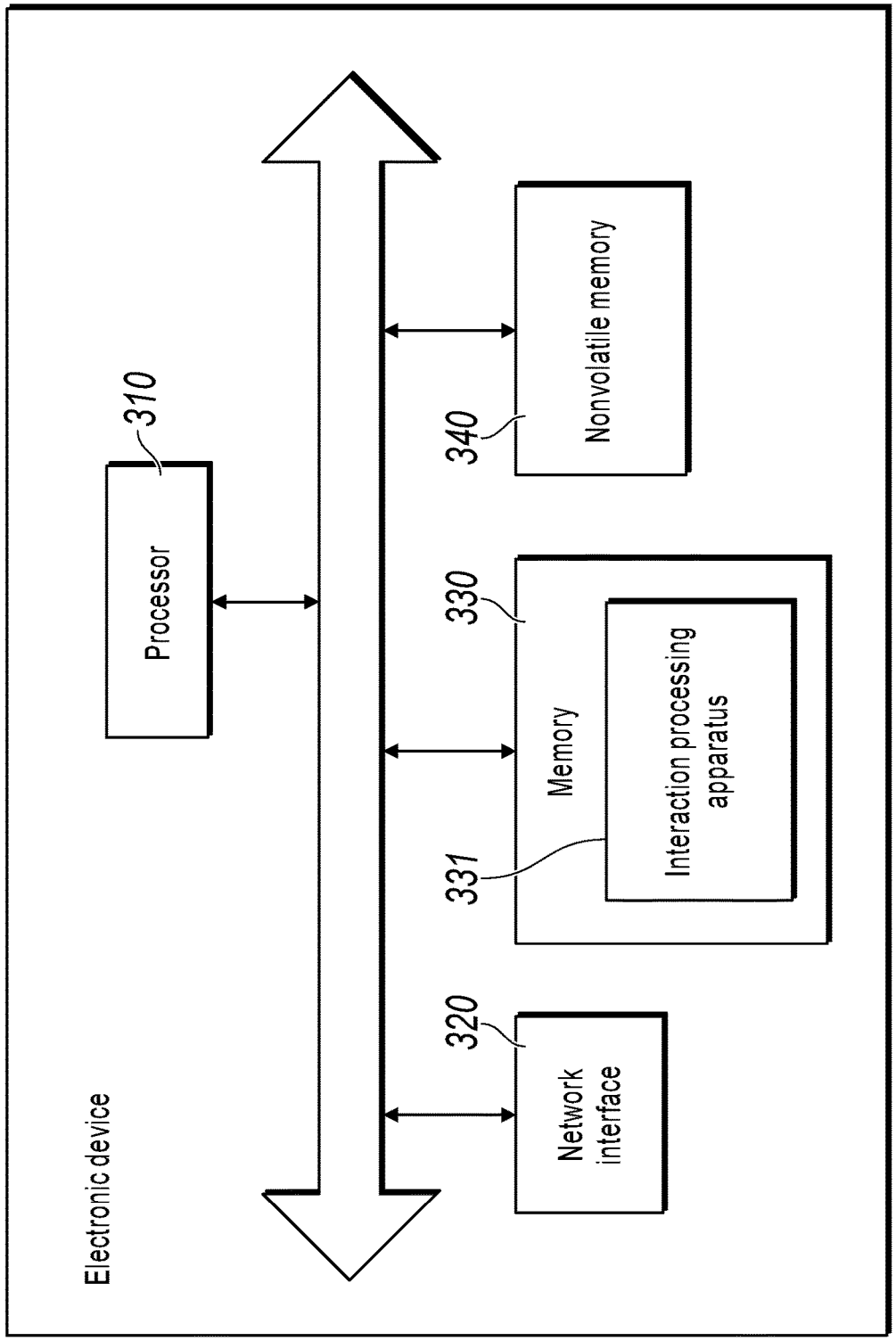
FIG. 3 is a diagram illustrating an example of a hardware structure of an electronic device that a service processing device is located in, according to embodiment of the specification.

The embodiments of the service processing device in the specification can be applied to the electronic device. The device embodiments can be implemented by using software, or can be implemented by using hardware or a combination of hardware and software. Using software embodiments as an example, a device in a logical sense is obtained after a processor that performs service processing reads a corresponding computer program instruction in a non-volatile memory to a memory to run. From a perspective of hardware, FIG. 3 is a diagram illustrating a hardware structure of an electronic device that a service processing device is located in, according to the specification. In addition to a processor 310, a memory 330, a network interface 320, and a non-volatile memory 340 shown in FIG. 3, the electronic device that the device 331 in some embodiments is located in usually can further include other hardware based on actual functions of the electronic device. Details are omitted here for simplicity.

Figure 4:
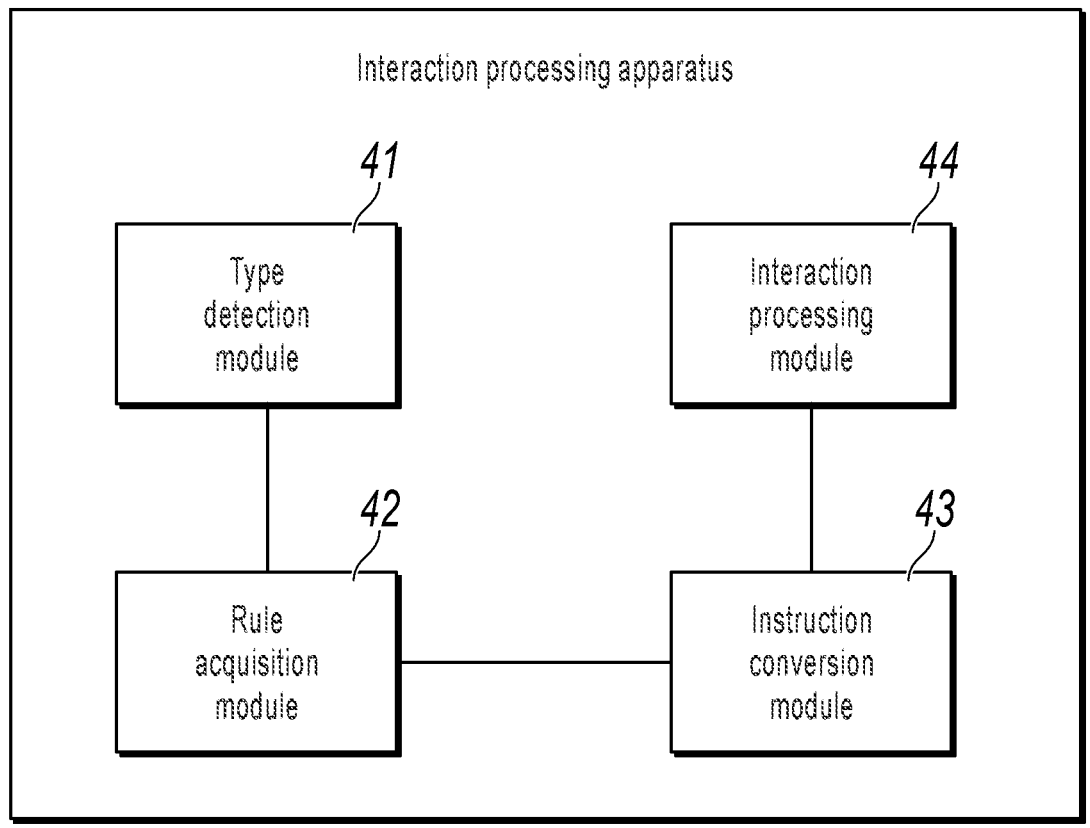
FIG. 4 is a block diagram illustrating an example of a service processing device, according to embodiments of the specification.

FIG. 4 is a block diagram illustrating an example of a service processing device, according to some embodiments of the specification. An instruction processing rule corresponding to each device type is configured according to the device, and the device includes the following: a type detection module 41, configured to detect a device type of an electronic device that needs to display interaction data; a rule acquisition module 42, configured to obtain an instruction processing rule corresponding to the detected device type; an instruction conversion module 43, configured to obtain, based on the instruction processing rule, a device interaction instruction initiated by the electronic device, and convert the device interaction instruction into a corresponding unified interaction instruction; and a service processing module 44, configured to process the interaction data by invoking a service processing mode corresponding to the unified interaction instruction obtained through conversion, and provide processed interaction data for the electronic device for display.

In an optional embodiment, the type detection module 41 is further configured to: initiate a device type query request to the electronic device; and receive device type description information fed back by the electronic device based on the query request, and determine the device type based on the device type description information.

In an optional embodiment, the instruction processing rule includes an instruction acquisition rule used to obtain the device interaction instruction initiated by the electronic device, and an instruction set conversion rule used to convert the device interaction instruction into the corresponding unified interaction instruction.

In an optional embodiment, the instruction processing rule is preconfigured in the following way: receiving a correspondence among a device type, a device interaction instruction, and a unified interaction instruction that are sent by a development side device, and configuring the instruction processing rule based on the correspondence.

In an optional embodiment, a coding scheme for the unified interaction instruction is a coding scheme of one of different device types for a device interaction instruction.

Correspondingly, the specification further provides a service processing device, including a processor and a memory configured to store a processor executable instruction, where the processor is configured to: detect a device type of an electronic device that needs to display interaction data; obtain an instruction processing rule corresponding to the detected device type; obtain, based on the instruction processing rule, a device interaction instruction initiated by the electronic device, and convert the device interaction instruction into a corresponding unified interaction instruction; and process the interaction data by invoking a service processing mode corresponding to the unified interaction instruction obtained through conversion, and provide processed interaction data for the electronic device for display.

For specific embodiments of processes of functions and roles of the modules in the service processing device, reference is made to embodiments of processes of corresponding steps in the service processing method. Details are omitted here for simplicity.

Because a device embodiment basically corresponds to a method embodiment, for related parts, reference can be made to partial descriptions in the method embodiment. The described device embodiment is merely an example. The modules described as separate parts can or cannot be physically separate, and parts displayed as modules can or cannot be physical modules, in other words, can be located in one location, or can be distributed in a plurality of network modules. Some or all of the modules can be selected based on actual needs, to achieve the objectives of the solutions of the specification. A person of ordinary skill in the art can understand and implement the embodiments of the present specification without creative efforts.

A person skilled in the art can easily figure out other embodiment solutions of the specification after considering the specification and practicing the specification disclosed here. The specification is intended to cover any variations, functions, or adaptive changes of the specification. These variations, functions, or adaptive changes comply with general principles of the specification, and include common knowledge or a commonly used technical means in the technical field that is not disclosed in the specification. The specification and the embodiments are merely considered as examples, and the actual scope and the spirit of the specification are pointed out by the following claims.

It should be understood that the specification is not limited to the accurate structures that are described above and that are shown in the accompanying drawings, and modifications and changes can be made without departing from the scope of the specification. The scope of the specification is limited only by the appended claims.

The previously described descriptions are merely examples of embodiments of the specification, but are not intended to limit the specification. Any modification, equivalent replacement, or improvement made without departing from the spirit and principle of the specification should fall within the protection scope of the specification.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate embodiments may be implemented, in combination, in a single embodiment, while features described as a single embodiment may be implemented in multiple embodiments, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

The invention claimed is:

1. A method for providing uniform instructions for modifying presentation of data on a display, the method comprising:
    detecting a device type of an electronic device, wherein the device type comprises one of following: a virtual reality (VR) device, a device that supports a gravity sensing function, a device that supports a gesture recognition function, or a device that accesses a mouse;
    receiving, from a development side device, an instruction need message defining a correspondence between the device type, a device interacting instruction, and a unified interaction instruction;
    configuring an instruction processing rule by defining a process for converting a first device interaction instruction to the unified interaction instruction for the device type according to the instruction need message;
    invoking the instruction processing rule;
    obtaining, based on the instruction processing rule, the first device interaction instruction initiated in response to a user interacting with the electronic device, wherein the first device interaction instruction comprises an instruction generated in response to the user interacting with the electronic device;
    converting, according to the instruction processing rule, the first device interaction instruction into a first unified interaction instruction corresponding to the first device interaction instruction; and
    updating interaction data output to a display based on the first unified interaction instruction.

2. The method according to claim 1, wherein detecting the device type of the electronic device comprises:
    transmitting a device type query request to the electronic device;
    receiving device type description information from the electronic device responsive to the device type the query request; and
    determining the device type based on the device type description information.

3. The method according to claim 2, wherein the device type description information comprises a MAC address, a device name, or a device model.

4. The method according to claim 1, wherein the instruction processing rule comprises an instruction acquisition rule to obtain the first device interaction instruction.

5. The method according to claim 1, wherein the unified interaction instruction comprises a coding scheme corresponding to a first device type of a plurality of different device types.

6. The method according to claim 1, wherein the electronic device comprises a personal computer, an intelligent end-user device or a virtual reality device.

7. A non-transitory computer-readable medium storing one or more instructions executable by a computer system to perform operations comprising:
  detecting a device type of an electronic device, wherein the device type comprises one of following: a virtual reality (VR) device, a device that supports a gravity sensing function, a device that supports a gesture recognition function, or a device that accesses a mouse;
  receiving, from a development side device, an instruction need message defining a correspondence between the device type, a device interacting instruction, and a unified interaction instruction;
  configuring an instruction processing rule by defining a process for converting a first device interaction instruction to the unified interaction instruction for the device type according to the instruction need message;
  invoking the instruction processing rule;
  obtaining, based on the instruction processing rule, the first device interaction instruction initiated in response to a user interacting with the electronic device, wherein the first device interaction instruction comprises an instruction generated in response to the user interacting with the electronic device;
  converting, according to the instruction processing rule, the first device interaction instruction into a corresponding first unified interaction instruction; and
  updating interaction data output to a display based on the first unified interaction instruction.

8. The non-transitory computer-readable medium of claim 7, wherein detecting the device type of the electronic device comprises:
  transmitting a device type query request to the electronic device;
  receiving device type description information from the electronic device responsive the query request; and
  determining the device type based on the device type description information.

9. The non-transitory computer-readable medium of claim 8, wherein the device type description information comprises a MAC address, a device name, or a device model.

10. The non-transitory computer-readable medium of claim 7, wherein the instruction processing rule comprises an instruction acquisition rule to obtain the first device interaction instruction.

11. The non-transitory computer-readable medium of claim 7, wherein the unified interaction instruction comprises a coding scheme corresponding to a first device type of a plurality of different device types.

12. The non-transitory computer-readable medium of claim 7, wherein the electronic device comprises a personal computer, an intelligent end-user device, or a virtual reality device.

13. A system, the system comprising:
  one or more computers; and
  one or more computer memory devices interoperably coupled with the one or more computers and having tangible, non-transitory, machine-readable media storing one or more instructions that, when executed by the one or more computers, perform one or more operations comprising:
    detecting a device type of an electronic device, wherein the device type comprises one of following: a virtual reality (VR) device, a device that supports a gravity sensing function, a device that supports a gesture recognition function, or a device that accesses a mouse;
    receiving, from a development side device, an instruction need message defining a correspondence between the device type, a device interacting instruction, and a unified interaction instruction;
    configuring an instruction processing rule by defining a process for converting a first device interaction instruction to the unified interaction instruction for the device type according to the instruction need message;
    invoking the instruction processing rule;
    obtaining, based on the instruction processing rule, the first device interaction instruction initiated in response to a user interacting with the electronic device, wherein the first device interaction instruction comprises an instruction generated in response to the user interacting with the electronic device;
    converting, according to the instruction processing rule, the first device interaction instruction into a first unified interaction instruction corresponding to the first device interaction instruction; and
    updating interaction data output to a display based on the first unified interaction instruction.

14. The system of claim 13, wherein detecting the device type of the electronic device comprises:
  transmitting a device type query request to the electronic device;
  receiving device type description information from the electronic device responsive to the device type query request; and
  determining the device type based on the device type description information.

15. The system of claim 14, wherein the device type description information comprises a MAC address, a device name, or a device model.

16. The system of claim 13, wherein the instruction processing rule comprises an instruction acquisition rule to obtain the first device interaction instruction.

17. The system of claim 13, wherein the unified interaction instruction comprises a coding scheme corresponding to a first device type of a plurality of different device types.

* * * * *

UNITED STATES PATENT AND TRADEMARK OFFICE
CERTIFICATE OF CORRECTION

PATENT NO. : 10,884,767 B2  
APPLICATION NO. : 16/663977  
DATED : January 5, 2021  
INVENTOR(S) : Yuguo Zhou Page 1 of 1

It is certified that error appears in the above-identified patent and that said Letters Patent is hereby corrected as shown below:

On the Title Page

Column 1 (Item (63) related U.S. Application Data), Line 2, delete "2017." and insert -- 2018. --, therefor.

In the Claims

Column 14, Line 54, in Claim 2, after "type" delete "the".

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*